Dec. 6, 1955 E. BURDEN 2,726,018
COMBINED DISPLAY, DISPENSING AND COOLING APPARATUS
Filed Jan. 16, 1952 2 Sheets-Sheet 1

INVENTOR
EVERETT BURDEN
BY *Mason, Mason & Sheridan*
ATTORNEY

Dec. 6, 1955          E. BURDEN          2,726,018
COMBINED DISPLAY, DISPENSING AND COOLING APPARATUS
Filed Jan. 16, 1952          2 Sheets-Sheet 2
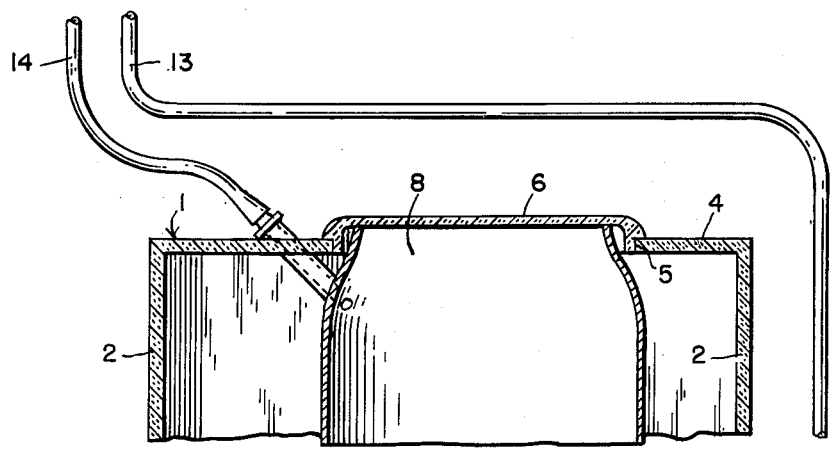
FIG. 2.
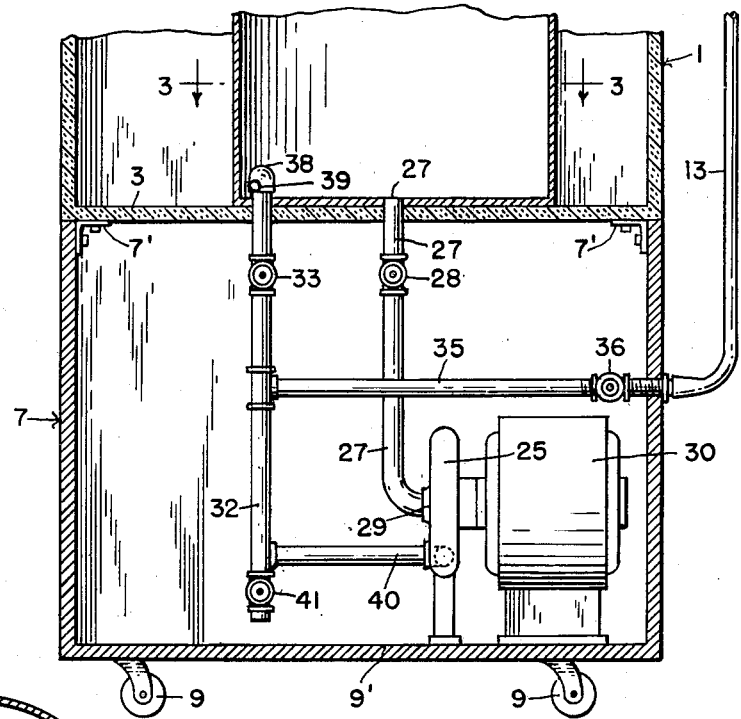
FIG. 3.
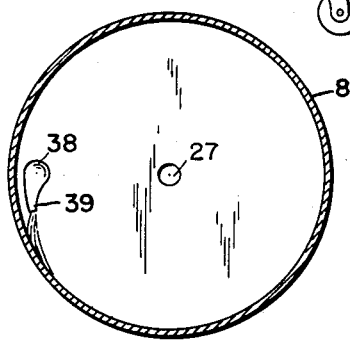
*INVENTOR*
EVERETT BURDEN
BY *Mason, Mason & Sheridan*
ATTORNEY

United States Patent Office 2,726,018
Patented Dec. 6, 1955

2,726,018

COMBINED DISPLAY, DISPENSING AND COOLING APPARATUS

Everett Burden, Cleveland, Ohio

Application January 16, 1952, Serial No. 266,647

2 Claims. (Cl. 222—190)

This invention relates to a combined display, dispensing and cooling apparatus for chilled liquids, and relates in particular to an apparatus for simultaneously keeping a beverage stirred and for incorporating air into the beverage.

The primary object of this invention is the provision of an apparatus wherein chilled liquid is dispensed directly from its source of supply and not from a display container and wherein the liquid storage means for the liquid to be dispensed is provided with an agitator for circulating the liquid therein to insure complete mixing and to prevent any solids in the liquid from gathering in one particular locale.

A further object of this invention is to return the beverage from the display to a reservoir in a cascading stream to cause air bubbles to be carried into the beverage and to stir the beverage rapidly in the reservoir to break up the air bubbles and to dissolve the air into the beverage.

These and other objects are effected by my invention as will be apparent from the following description taken in accordance with the accompanying drawings forming a part of my application in which Figure 1 is a side elevational view, partly in section, of a combined display, dispensing and cooling apparatus embodying my invention.

Figure 2 is a slightly enlarged sectional view of the apparatus taken approximately along the lines 2—2 of Figure 1.

Figure 3 is also a sectional view taken approximately along the lines 3—3 of Figure 2.

Figure 1:
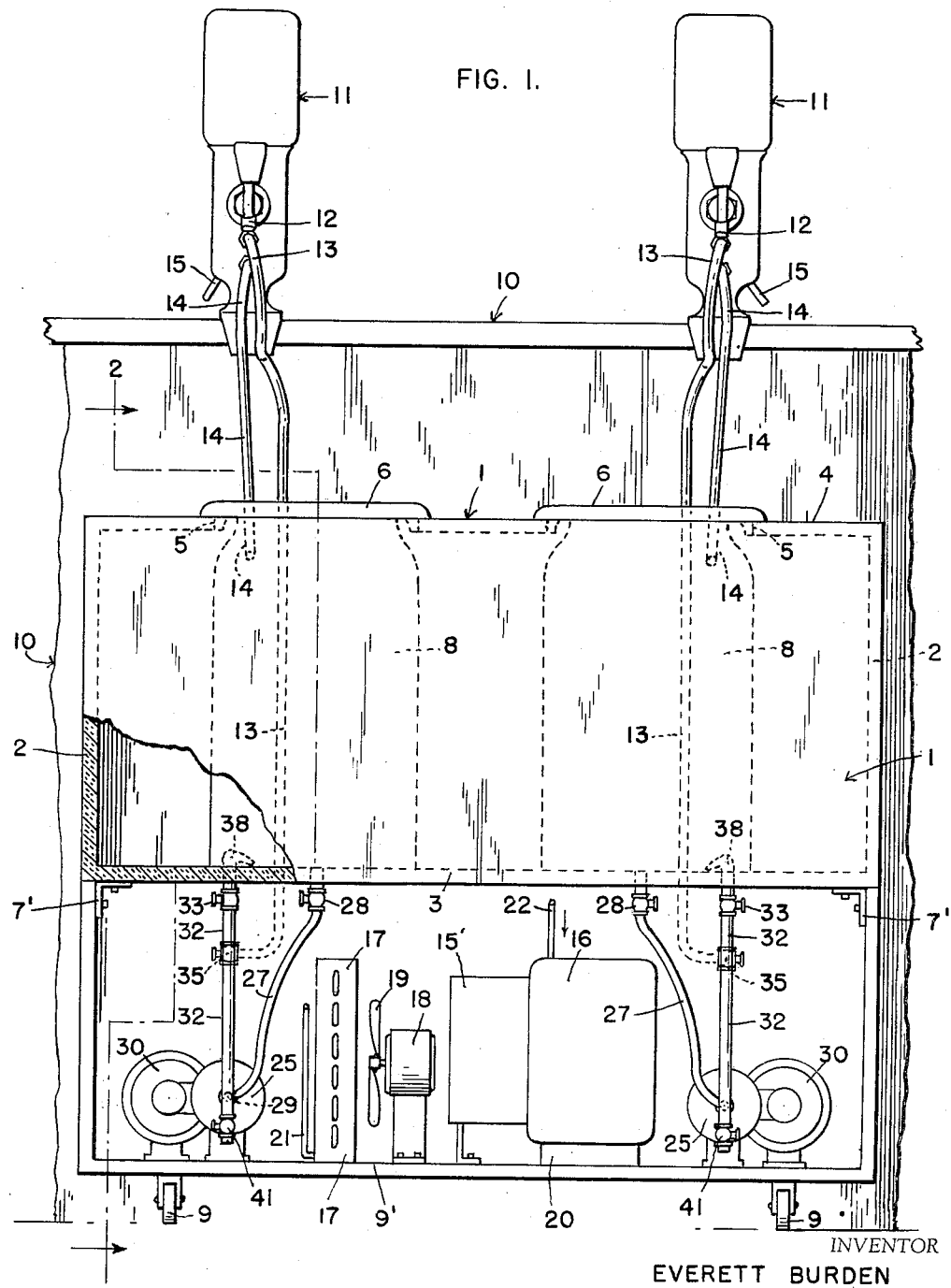

As is well known, chilled liquids such as fruit juices of all types contain a certain amount of solid matter and it is unpleasant in drinking such juices unless this matter is evenly distributed throughout the juice. Prior art devices, as far as I am aware, have not made provision for circulating this solid matter in the manner hereinafter described but, instead, it has been necessary to stir the juices in a storage container to distribute the matter. I have overcome this problem by providing an apparatus including a liquid storage tank wherein agitating means is provided for circulating the solid matter throughout the liquid in the container so that it is evenly distributed. Broadly, this is accomplished by pumping the liquid in the container through a T connection whereby some of the liquid is directed to the dispensing means and the remaining liquid is returned to the container and directed in the container at a side thereof adjacent the bottom at an angle and substantially tangentially thereof.

Further to efficiently cool such liquid, when using conventional refrigeration apparatus, circulation of the liquid is necessary as such permits the liquid to be maintained at a relatively constant temperature. The use of the above described agitating system accomplishes this and permits such efficient action.

It has been found that a non-carbonated beverage has more sparkle and taste if air is incorporated therein to a considerable degree. It has also been found that by cascading the beverage into a reservoir and rapidly stirring the beverage in the reservoir, the air carried into the body of liquid by the cascading stream will be largely dissolved or reduced to such a fine state of subdivision that a high degree of aeration is obtained.

One embodiment of the apparatus for accomplishing the foregoing purposes, as illustrated in the accompanying drawings, comprises a housing 1 having insulated side walls 2 and an insulated bottom wall 3. The top of this housing 4 is also insulated by any suitable means and is provided with openings 5 through which the top of containers or cans 8 extend, the containers being supported on wall 3 and provided with covers 6. The containers and covers are of material of the type usually employed when refrigeration coils are wrapped around the exterior of the body portion of the containers as will hereinafter be explained. The housing or unit 1 is supported on a partition or unit generally represented by numeral 7. The unit 7 is of any suitable material and is provided with L-irons 7' adjacent the top thereof to support unit 1 and the bottom 9' of the unit forms a support for the several pieces of equipment contained therein. Although the construction of unit 7 and housing 1, per se, form no part of this invention, it can be seen from the embodiment illustrated that unit 7 is merely a base or support for the insulated housing 1 and for the storage of equipment to be hereinafter described. Any suitable housing, properly insulated, and base unit, having access to the interior thereof, is within the scope of this invention.

The removable covers or caps 6 are provided with flanges which, when in place, rest on the edges of top wall 4 for support. The unit 7 is also provided with any suitable means, such as wheels 9 so that the apparatus may be conveniently moved.

The rear view of a restaurant counter is shown in Fig. 1 of the drawing at 10 and supported, by any suitable means, on the counter are two dispensing and display devices generally represented by numeral 11. The devices 11 are of the type shown and claimed in my co-pending application Ser. No. 154,623 and are provided with the usual dispensing faucets or spigots 12, inlet pipe line 13, outlet or return pipe line 14, which is readily detachable from a container 8 and which may extend into housing 1 through any wall thereof, and condensation tube 15. For a complete description of the operation and detailed construction of devices 11, reference is made to my co-pending application. Preferably the lines 13 and 14 are in the nature of flexible hoses.

Referring to Fig. 1 of the drawings, there is shown a cooling unit generally represented by numeral 15'. This unit may be of any approved construction such as an electric, gas or other type of refrigerator and forms, by itself, no part of the instant invention. As shown, however, as one type of cooling unit that may be used, numeral 16 represents a motor-compressor unit, numeral 17 represents a condenser of a refrigeration system, numeral 18 a motor to drive a cooling fan 19 for cooling the condenser. As is clear, the refrigeration system shown, or other type of system that may be used, is for the purpose of cooling the liquid in the containers 8. The motor-compressor unit is supported on the base 9' of housing 7 by means 20. One of the sides of the unit 7 may be open or removable to provide access to the refrigeration system and the pump systems to be hereinafter described. Also any type of refrigerant gas may be employed.

The liquid in containers 8 is refrigerated by means of a refrigerant evaporator comprising a plurality of coils (not shown) helically arranged in the conventional manner around the containers and connected to condenser 17 by a conduit 21 and to compressor 16 by conduit 22. The evaporator is not shown as such is conventional and well known. Also the compressor may be started and stopped by any suitable means such as a thermostat (not shown) responsive to the temperatures of the liquid in the container 8.

There is shown in Fig. 1 motor means 30, a pair of pumps 25, a plurality of pipes and valves connected in the conduits or pipes. The valves may be of any suitable type. Each of the pumps and valve systems shown in Fig. 1 are identical and therefore the detailed operation and structure of only one system will be described.

Referring to Figures 2 and 3, there is shown a pump 25 driven by suitable motor means 30. Extending from the bottom of each of the containers 8 is a conduit 27 which passes through an opening in the bottom 3 through valve means 28 to the intake 29 of pump 25. The supply from pump 25 is taken or forced from the bottom of the pump through line 40 to line 32, one end of line 32 having a normally closed drain valve 41. Part of the liquid passing upward under pressure in line 32 enters valve means 33 and part enters conduit 35 thereby dividing the supply of liquid from pump 25 through a T-branch or connection 45.

Preferably a similar pump and valve system is used for each container and display-dispensing device although it is within the scope of this invention to use one pump for a plurality of containers 8. For example, it is within the skill of one familiar with this art to rearrange the various conduits and valves connected with two or more containers for usage with a common pump but in such a case the liquid in each container must be of the same type and flavor. However, hereinafter the operation of the entire apparatus will be described in connection with the use of one pump and valve system for each container and display-dispenser, as shown in Fig. 2, it being understood that operation of the liquid in the second or third container is identical and that similar pump and valve means are employed for each, as shown generally in Fig. 2, unless a modification as suggested above, wherein a common pump is assembled, is used.

As shown in Fig. 2, conduit 35 is coupled through valve 36 with line 13 and, therefore, is forced from container 8, to device 11. Detachably connected to conduit 32, which extends through the bottom of container 8 and wall 3 is a tube-like member, or nozzle, 38. The end 39 of this nozzle 38, which may be easily detached from conduit 32 and adjusted angularly thereon, is preferably directed, adjacent the bottom of container 8, towards a side thereof at an angle with the side wall of the container 8. This is an important feature of this invention, as is the arrangement for dividing the flow of liquid from pump 25, and a more complete showing of the position of the nozzle is made in Figure 3.

In operation, one or a plurality of containers 8 are filled, by removing cap 6, with any suitable type of juice, preferably a fruit juice containing solid matter. Thereafter, motor means 30 is started together with the refrigeration system 15. Liquid is drawn from container 8 through line 27, valve means 28 to the intake 29 of pump 25. From the output of pump 25, the liquid enters, through 40, and passes through line 32, since valve 41 is closed, to the T-connection 45 and takes under pump pressure separate paths, some of the liquid continuing through conduit 32, valve 33, to nozzle 38 and some passing through conduit 35, valve 36, to inlet line 13. The liquid in line 13 enters the display-dispensing apparatus 11 in a manner described in my co-pending application Ser. No. 154,623 and some of the liquid may be dispensed by operating the faucet 12 and some of the liquid returns to container 8 through return line 14. The liquid passing into line 32 through valve 33 exits from nozzle end 39 and strikes the sides of container 8 to give a circulatory motion, as shown in Fig. 3, to all of the liquid contained in the container 8 and thereby evenly distributes the solid material in container 8.

The line 14 returning the beverage from the dispensing and display head 11 to the container 8 enters near the top of the container 8 above the normal liquid level in the container. The flavor of beverages dispensed by this apparatus had a noticeably superior taste over the beverage made of the identical components syrup and water when mixed in a container and ladled out into cups, for example, as in a punch bowl. It was discovered that the returning beverage cascaded from the return line 14 into the reservoir liquid carried a considerable amount of atmospheric air down into the body of liquid in storage and that the rapid stirring by the jet of fluid from nozzle 38 intimately mixed the air and beverage together and caused a considerable portion of the entrained air to be absorbed by the body of the liquid in storage, or reduced it to such a fine state of sub-division that it splits slowly from the body of liquid. It was the aeration that make the beverage "alive" and better tasting than the identical beverage in a dead state. Accordingly, the very circulation of the beverage to the dispensing and display head and return to the reservoir in a cascading manner, coupled with the rapid stirring in the reservoir, has been found to materially enhance the taste of the beverage. The jet type of stirring causes a superior incorporation of the entrained air over mechanical stirring although mechanical stirring is acceptable.

The foregoing description of the invention is explanatory thereof and various changes in the size, shape and of the materials used, as well as in the details of the appended claims, without departing from the spirit of the invention.

I claim:

1. A beverage dispensing system, comprising, a reservoir tank, fluid jet means to stir liquid in said tank, a dispensing means remote from said tank, pump means, a fluid line from the bottom area of said reservoir tank to said pump means, a first supply line from said pump means to said fluid jet means in the reservoir tank, a second supply line from said pump means to said dispensing means, a return line from said dispensing means to the reservoir tank above the normal liquid level thereof positioned to project a stream of beverage into the body of reservoir to cause entraining of air in the body of liquid in the reservoir, whereby a continuous flow of liquid is supplied to said dispensing means at all times, and whereby the cascading stream of returning liquid to the reservoir carries entrained air into the body of liquid by the physical action of falling, and the stirring action causes the air to be dissolved in the liquid.

2. A beverage dispensing system, comprising, a reservoir tank, means to rapidly stir liquid in said tank, a dispensing means remote from said tank, pump means, a fluid line from the bottom area of said reservoir tank to said pump means, a supply line from said pump means to said dispensing means, a return line from said dispensing means to the reservoir tank above the normal liquid level thereof positioned to project a stream of beverage into the body of reservoir to cause entraining of air in the body of liquid in the reservoir, whereby a continuous flow of liquid is supplied to said dispensing means at all times, and whereby the cascading stream of returning liquid to the reservoir carries entrained air into the body of liquid by the physical action of falling, and the stirring action causes the air to be dissolved in the liquid.

References Cited in the file of this patent

UNITED STATES PATENTS

| | | |
|---|---|---|
| 1,399,474 | Gorman | Dec. 6, 1921 |
| 1,593,853 | Smith et al. | July 27, 1926 |
| 1,706,418 | Sissom | Mar. 26, 1929 |
| 1,808,117 | McLellan | June 2, 1931 |
| 2,675,145 | Jacobs | Apr. 13, 1954 |